(12) United States Patent
Honeywell

(10) Patent No.: US 12,511,628 B2
(45) Date of Patent: Dec. 30, 2025

(54) TRANSACTION SYSTEM AND METHOD

(71) Applicant: Sean William Honeywell, Durban (ZA)

(72) Inventor: Sean William Honeywell, Durban (ZA)

( * ) Notice: Subject to any disclaimer, the term of this patent is extended or adjusted under 35 U.S.C. 154(b) by 112 days.

(21) Appl. No.: 18/573,322

(22) PCT Filed: Jun. 24, 2022

(86) PCT No.: PCT/IB2022/055893
§ 371 (c)(1),
(2) Date: Dec. 21, 2023

(87) PCT Pub. No.: WO2022/269564
PCT Pub. Date: Dec. 29, 2022

(65) Prior Publication Data
US 2024/0127202 A1 Apr. 18, 2024

Related U.S. Application Data

(60) Provisional application No. 63/214,440, filed on Jun. 24, 2021.

(30) Foreign Application Priority Data

Jun. 24, 2021 (NL) .................... 2028536
Jun. 24, 2021 (ZA) .................... 2021/04342

(51) Int. Cl.
*G06Q 20/10* (2012.01)
*G06Q 20/38* (2012.01)
*H04L 9/06* (2006.01)

(52) U.S. Cl.
CPC ......... *G06Q 20/10* (2013.01); *G06Q 20/3821* (2013.01); *H04L 9/0643* (2013.01)

(58) Field of Classification Search
CPC ... G06Q 20/10; G06Q 20/3821; H04L 9/0643
See application file for complete search history.

(56) References Cited

U.S. PATENT DOCUMENTS 8,249,953 B2    8/2012  Howarth et al.
2016/0021066 A1* 1/2016  Parvathaneni ........ H04W 12/04
                                                  713/171
(Continued)

FOREIGN PATENT DOCUMENTS

WO    WO 2020/028615    2/2020
WO    WO 2020/128895    6/2020
(Continued)

OTHER PUBLICATIONS

International Search Report and Written Opinion for International (PCT) Patent Application No. PCT/IB2022/055893, dated Oct. 17, 2022, 8 pages.

*Primary Examiner* — Clayton R Williams
(74) *Attorney, Agent, or Firm* — Vani Moodley, Esq

(57) ABSTRACT

The invention relates to methods of processing financial transactions in a centralised system including slave and central servers. The method comprises generating, by the slave server, a first transaction block associated with a validated first data packet including data collected from a user device initiating a transaction session. After generation of the first transaction block, the method comprises generating, by the slave server, a transaction block associated with each data packet subsequently collected between either the user device and a central server or between the central server and the slave server, with the proviso that each time a data packet is collected, the data packet is validated against data in at least one of the first transaction block and a predecessor transaction block that is in a chain of transaction blocks associated with the first transaction block. The invention extends to an associated transaction system.

22 Claims, 4 Drawing Sheets

(56) References Cited

U.S. PATENT DOCUMENTS

2016/0117262 A1* 4/2016 Thom .................. H04L 9/0825
                                                              713/189
2020/0220719 A1* 7/2020 Chaudhari ............ H04L 9/0822
2021/0035203 A1   2/2021 Daigle et al.

FOREIGN PATENT DOCUMENTS

WO   WO 2021/041641   3/2021
WO   WO 2022/269564   12/2022

* cited by examiner

TRANSACTION SYSTEM AND METHOD

CROSS REFERENCE TO RELATED APPLICATIONS

This application is a national stage application under 35 U.S.C. 371 and claims the benefit of PCT Application No. PCT/IB2022/055893 having an international filing date of 24 Jun. 2022, which designated the United States, which PCT application claimed the benefit of Netherland Patent Application No. 2028536 filed 24 Jun. 2021, U.S. Provisional Application No. 62/214,440 filed 24 Jun. 2021, and South Africa Patent Application No. 2021/04342 filed 24 Jun. 2021, the disclosures of each of which are incorporated herein by reference in their entireties.

FIELD OF INVENTION

THIS invention relates to a transaction, in particular a financial transaction system and a method of operating a financial transaction system, in particular with respect to the transfer of funds between a payer bank and payee/beneficiary bank. The invention also extends to a method of, and system for, processing a payment to a beneficiary. The financial transaction system is further arranged to ensure that a financial transaction is verified using encryption related techniques, to enable a beneficiary to expedite funds into an account of the beneficiary

BACKGROUND OF INVENTION

There are currently millions of transactions taking place on a daily basis with interbank Electronic Funds Transfers (EFT) being the second most popular online payment method in South Africa (and other banking markets) after debit and credit cards transactions. Interbank EFTs are a common payment rail between all banks globally. It is a reality across all platforms of Electronic Banking that bank-to-bank (not within the same bank but rather between different banks interbank) transactions often encounter a delay from the time of a payment from a payer account of a payer at the payer's bank to the time of clearance to a beneficiary account of a beneficiary of said payment at the beneficiary's bank.

An immediate clearance option has provided the payer/sender (but not the recipient/beneficiary) with an option to pay an additional fee for immediate clearance to the beneficiary. This has become a huge income stream for financial institutions but has no direct financial benefit to the payer/sender and is a contradiction in its logic in that the sender fits the bill for the convenience of the beneficiary receiving the transferred funds immediately.

In an event that the payer refuses to bear the immediate clearance cost, the beneficiary would have to wait for clearance of the funds in respect of payment. It can typically take around 1 to 3 days for the funds to reflect in the beneficiary's bank account. This is problematic especially if the beneficiary is relying on receipt of funds for certain financial obligations.

Also, in the current setting where fraudsters may (provide fraudulent proof of payment notifications) hack into a banking system and reroute funds intended for a beneficiary to another account, it is required for the financial transaction and accordingly the beneficiary to be verified by a bank or an intermediary institution affiliated with the bank for purposes of verifying such a transaction, prior to the funds being released into the account of the intended beneficiary.

It is accordingly the object of the present invention to provide a financial transaction system and method which will allow for the expedition of the clearance of funds while at the same time ensure that the transaction is verified prior to the payment of funds into the beneficiary's account. This provides for a secure audit trail for each transaction. For ease of explanation, it will be appreciated that the terms "money" and "funds" are used interchangeably herein; the terms "payer", "payor", "sender", "transferrer" are used interchangeably herein; the terms "payment", "transfer" are used interchangeably herein; and the terms "beneficiary", "recipient", and "transferee" are also used interchangeably herein.

The payor should be understood to be a payor in the sense of either a juristic person or a natural person making a payment via a network into an account of a beneficiary.

SUMMARY OF INVENTION

According to a first aspect of the invention, there is provided a method of processing a financial transaction through a centralised transaction encryption system including a slave server and a central server in communication with the slave server through a closed loop, centralised network, the method comprising:

generating, by the slave server, a first transaction block associated with a validated first data packet including validated data collected at least from a user device initiating a transaction session; and after the generation of the first transaction block, the method comprising generating, by the slave server, a transaction block associated with each data packet subsequently collected between either the user device and a central server or between the central server and the slave server, with the proviso that each time a data packet is collected, the data packet is validated against data in at least one of the first transaction block and a predecessor transaction block that is in a chain of transaction blocks associated with the first transaction block.

Prior to generating the first transaction block, the method may include collecting, by the central server, the first data packet from the user device initiating the transaction session.

The first data packet may include an indication that a message related to the transaction has been received and opened by the beneficiary via the user device or that the beneficiary has autonomously initiated communication with the central server.

The first data packet may include identifier data of the beneficiary associated with the user device and the unique identification data of the user device.

The method may include validating, by the central server, the first data packet, or some data elements in the first data packet, against a predefined set of pre-registered data, to thus enable the validated first data packet to be transmitted to the slave server.

The first transaction block may include the validated first data packet and an encryption code, in particular a hash, more in particular an Originator/Alpha hash embedded/incorporated in the validated first data packet.

Prior to the first data packet being collected, the method may include receiving a payment notification message that a payer is paying or has paid, over a payment network, a beneficiary a predefined amount of money.

After the message has been received with respect to payment of the money by the payor, the method may include the step of generating a suitable transfer notification message for transmission to the beneficiary via the user device, wherein a transaction session, arranged to initiate the validation of at least the first data packet, initiating upon the beneficiary at least opening the transfer notification message via the user device.

Each time a data packet is collected between the central server and the user device or each time a data packet is collected between the central server and slave server, the method may include the step of verifying, by the slave server, the data packet against data elements in a predecessor transaction block to thus enable the slave server to generate a new transaction block associated with the validated data packet.

The method may include the step of including, by the slave server, an encryption code in the form of a hash, in particular a hash associated with or linked to a hash of a predecessor transaction block including the Originator hash in the first transaction block.

The method may include terminating the transaction session when one of the collected data packets has been invalidated.

A transaction session in the context of the invention refers to a period in which a user device is in communication with the central server on the private, centralised network and information (transmitted as data packets/signals/messages) are transmitted between the user device and central server. It will be appreciated that as and when the data packets are transmitted between the central server and user device, the slave server is arranged to intercept and validate the data packets during the course of the transaction session.

In the context of the present invention, the transaction session may be in respect of a financial transaction including a request by a beneficiary to expedite the clearance of funds into an account associated with the beneficiary.

As mentioned previously, the clearance of funds may be from an account of a payor that is associated with a first bank, to an account of a beneficiary that is associated with a second bank, where the first and second banks are not the same, and where the second bank of the beneficiary has a bank server, and wherein the bank server is in communication with the central server or the bank server is the central server.

In another example embodiment of the invention, the funds which are being paid to the beneficiary's account may be an advance made by a financial institution associated with the beneficiary into an account of the beneficiary, while the financial institution, for example a bank of the beneficiary, awaits clearance of funds from the payor's financial institution to the beneficiary's financial institution.

Upon all the required data packets collected during the transaction session being validated and corresponding transaction blocks thereof being generated to thus generate a chain of transaction blocks which are linked to the first transaction block, the method may include the steps of:
 determining whether any one of the validated data packets or transaction blocks includes data elements including an indication of whether the beneficiary desires to have funds cleared in an expedited fashion, and
 expediting or facilitating the expediting of the clearance of funds in a financial account of the beneficiary.

According to a second aspect of the invention, there is provided a centralised transaction processing system including:
 a slave server and a central server in communication with the slave server through a centralized network, wherein the slave server being arranged to generate a first transaction block associated with a validated first data packet including validated data collected at least from a user device initiating a transaction session; and
 after the generation of the first transaction block, the slave server being arranged to generate a transaction block associated with each data packet collected between either the user device and a central server or between the central server and the slave server, with the proviso that each time a data packet is collected, the data packet is validated against data in at least one of the first transaction block and a predecessor transaction block that is in a chain of transaction blocks associated with the first transaction block.

Prior to generating the first transaction block, the central server is arranged to collect the first data packet from at least the user device initiating the transaction session and accordingly validate the first data packet.

The first data packet may include an indication that the message related to the transaction has been received and opened by the beneficiary via the user device or that the beneficiary has autonomously initiated communication with the central server.

The first data packet may include identifier data of the beneficiary associated with the user device and the unique identification of the user device.

The central server may be configured to validate the first data packet against a predefined set of data, to thus enable the validated first data packet to be transmitted to the slave server.

The first transaction block may include the validated first data packet and an encryption code, in particular a hash, more in particular an Originator/Alpha hash embedded in the validated first data packet.

Prior to the first data packet being collected, the central server may be arranged to receive a payment notification message that a payer is paying or has paid a beneficiary a predefined amount of money.

After the message has been received with respect to payment of the money by the payor, the central server may be arranged to generate a suitable transfer notification message for transmission to the beneficiary via the user device, wherein the first data packet being collected from the user device upon the beneficiary at least opening the transfer notification message via the user device.

It will be appreciated that each time a data packet is collected between the central server and the user device or each time a data packet is collected between the central server and slave server, the slave server may be configured to verify the data packet against data in a predecessor transaction block to thus enable the slave server to generate a new transaction block associated with the validated data packet.

The slave server may be arranged to include in the newly generated transaction block, an encryption code in the form of a hash, in particular a hash associated with or linked to a hash of predecessor transaction block including the Originator hash in the first transaction block.

The system may be arranged to terminate the transaction session when one of the collected data packets has been invalidated.

The transaction session may be in respect of a financial transaction including a request by a beneficiary to expedite the clearance of funds from a source of the funds into an account associated with the beneficiary.

Upon all the required data packets collected during the transaction session being validated and corresponding transaction blocks thereof being generated to thus form a chain of transaction blocks which are linked to the first transaction block, the system may be configured to:
  determine whether any one of the collected data packets or transaction blocks includes an indication of whether the beneficiary desires to have funds cleared in an expedited fashion, and
  expedite or facilitate the expediting of the clearance of funds in a financial account of the beneficiary.

According to a third aspect of the invention, there is provided at least one non-transitory computer-readable storage medium storing computer executable instructions which may be arranged to cause at least one processor of a slave server and/or a central server to perform operations including any of the methods described herein, for example, the steps in accordance with the first aspect of the invention.

According to yet another aspect of the invention, there is provided a system comprising:
  at least one processor;
  at least one memory device communicatively coupled to the at least one processor, wherein the at least one memory device comprises non-transitory computer executable instructions which cause the at least one processor to perform any one of the methods as described herein when executed thereby.

According to another aspect of the invention, there is provided a computer-implemented method of securely processing a financial transaction over a private, centralised network in a transaction encryption system including a slave server, and a central server in communication with the slave server through the private, centralised network, wherein the method comprises:
  generating, by the slave server, a first transaction block associated with a validated first data packet including at least one or more validated data collected at least from a user device initiating a transaction session; and
  after the generation of the first transaction block, the method comprises:
  continuously intercepting, in real time and during the transaction session, by the slave server, subsequent data packets which are transmitted over the private, centralised network between the central server and the user device;
  generating, by the slave server, subsequent transaction blocks associated with each of the subsequent data packets intercepted during the transaction session, on the proviso that each time a subsequent data packet is intercepted during the transaction session, the said intercepted subsequent data packet is first validated by the slave server against data elements in at least one of the first transaction block and one or more transaction blocks generated after the generation of the first transaction block during the transaction session; and
  terminating the transaction session when one of the intercepted data packets is determined to be invalid by the slave server.

It will be noted that due to the speed of the transaction associated with the transaction session being processed, in order to be viable for a real time solution, whilst intercepting the payment notification, a private network as described herein is advantageous as it performs the operations described herein in real-time or near in real time. Moreover, private networks also provide better controls to the respective authorities/parties participating in the transaction.

Prior to generating the first transaction block, the method may comprises collecting, directly by the central server, the first data packet from the user device initiating the transaction session and validating at least one or more of the data in the first data packet so as to validate the first data packet, wherein the first data packet is communicated directly to the central server at the exclusion of the slave server.

In this way, fundamental activation of the centralized encryption network, by way of a centralised server obtaining the verified log in from the beneficiary/payor is initiated. The transaction and subsequent sequence of verification are all set on the initial validated log in credentials of the parties. This unlocks the next level of encryption (Hash Algorithm) which in turn records all steps of this communication pertaining to this specific transaction.

The first data packet may comprise data elements that comprise identifier data of a beneficiary associated with the user device. It will be noted that this step is a further validation that the correct beneficiary is being engaged. This is advantageous to secure the transaction.

The first data packet may comprise data elements that may comprise a unique identification data of the user device, wherein the identifier data of the beneficiary includes pre-registered credentials of the beneficiary, wherein the pre-registered credentials are arranged to enable the beneficiary, via the user device, to access and communicate with the central server.

Verification of the device and the beneficiary allow for a validated secure network which underpins the security of the transaction. The parameters of this criteria may be defined by the parties within the Central server.

The method may comprise:
  validating, by the central server, at least one or more data elements in the first data packet against a predefined set of data, wherein the predefined set of data includes pre-registered credentials of a beneficiary associated with the user device, to thus enable the validated first data packet to be transmitted to the slave server to enable the slave server to generate the first transaction block based on the validated first data packet.

This step may be advantageous for defining the parameters with deal with any audit trail or secure network.

The first transaction block may comprise a unique originator encryption code comprising a hash.

It will be noted that the central server may require a defined means of identification for each new transaction. In this regard, the slave server may be an independent or independently controlled and trusted $3^{rd}$ party server which facilitates a secure two-way communication network for the transaction.

The hash may be an Originator/Alpha hash. As discussed herein, the Originator/Alpha has may be generated by a suitable hash algorithm, for example, a conventional has algorithm. The hash may be incorporated in the validated first data packet. The hash algorithm may be an enhanced encryption technology which allows for a real-time validation and automatic termination, when any discrepancies are picked up, thereby creating a secure network and high-level audit trail.

Prior to the first data packet being collected, the method may comprise initiating the transaction session by receiving a suitable opt-in signal or message from the user device, wherein the opt-in signal is generated:
  in response to an electronic message associated with the financial transaction being opened or accessed by the user device; and/or
  in response to the user device initiating communication with the central server.

It will be appreciated that the opt-in signal functions as a log in mechanism (driven by the beneficiary) to unlock the next series of secure enabled network, via the initial verification by the beneficiary in response to responding to an opt-in electronic message or in other words an opt-in offer.

Each time a subsequent data packet is transmitted by either the user device or the central server after the generation of the first transaction block, the method may comprise a step of intercepting and verifying, by the slave server, the subsequent data packet against data elements in at least a predecessor transaction block generated immediately before the transmission of said subsequent data packet.

The private network comprising of the centralised server and a slave server may advantageously facilitate controlled real time communication, which leads to an immediate/real-time or near real-time secure transaction driven by the beneficiary.

The method may comprise a step of adding, by the slave server, a unique encryption code in each subsequently generated transaction block, wherein the unique encryption code of each transaction block comprises a hash, and the unique encryption code further comprising a unique originator hash of the first transaction block.

Assurance that all data packs and completed transaction chain are related to the original opt-in offer. This becomes a secured audit trail as well as maintaining the authentication during every step facilitating the transaction or transaction process.

The unique encryption code of each transaction block may comprise a hash associated with or linked to a hash of one or more transaction blocks generated prior to the generation of said subsequently generated transaction block.

In this way, authentication of the transaction takes place during every step in facilitating the transaction or the transaction process during the transaction session.

As mentioned herein, the transaction session may be in respect of a financial transaction, and wherein one of the subsequently collected data packets includes a data element configured to indicate a request by a beneficiary, via the user device, to expedite a clearance of funds into a financial account associated with the beneficiary. This step is advantageous to engage the beneficiary to respond and thereby verify themselves, in order to activate the sequence which facilitates/uses/creates the secure real time private network as contemplated and discussed herein.

Upon all the required data packets transmitted during the transaction session being validated and corresponding transaction blocks thereof being generated to thus generate a chain of transaction blocks which are linked to the first transaction block, the method may comprise:
    determining whether any one of the validated data packets or transaction blocks includes an indication of whether the beneficiary desires to have funds cleared in an expedited fashion, and
    expediting or facilitating the expediting of the clearance of funds in a financial account associated with the beneficiary.

This step is advantageous for recording the contractual opting-in of the beneficiary, who is driving the transaction.

According to another aspect of the invention, there is provided a centralised transaction encryption processing system, wherein the system comprises:
    a slave server; and
    a central server in communication with the slave server over a private, centralized network, wherein
    the slave server is arranged to generate a first transaction block associated with a validated first data packet including one or more validated data collected at least from a user device initiating a transaction session;
    wherein the slave server is configured to continuously intercept, in real time and during the transaction session, subsequent data packets which are transmitted over the private, centralised network between the central server and the user device; and
    wherein the slave server is configured to generate subsequent transaction blocks associated with each of the subsequent data packets intercepted during the transaction session, on the proviso that each time a subsequent data packet is intercepted, the said intercepted subsequent data packet is validated against data elements in at least one of the first transaction block and one or more transaction blocks generated after the generation of the first transaction block during the transaction session; and terminating the transaction session when an intercepted data packet is determined to be invalid by the slave server.

According to another aspect of the invention, there is provided a computer-implemented method of securely expediting the clearance of funds into a financial account of a beneficiary, wherein the method comprises:
    initiating a transaction session, by a beneficiary's device, over a private, centralised network;
    receiving, by the central server, a first data packet from the beneficiary's device, the first data packet including credentials of the beneficiary which are to be authenticated by the central server against a pre-set of pre-stored data;
    validating, by the central server, the first data packet;
    generating, by a slave server, in the private, centralised network, a first transaction block associated with the validated first data packet;
    wherein after the generation of the first transaction block, the method comprises:
    intercepting, by the slave server, during the transaction session subsequent data packets which are transmitted over the private, centralised network between the central server and the beneficiary's device, wherein one of the subsequent data packets comprises a data element comprising a request to expedite the transfer and clearance of funds into the financial account of the beneficiary;
    generating, by the slave server, in the private, centralised network, subsequent transaction blocks associated with each of the subsequent data packets intercepted during the transaction session, on the proviso that each time a subsequent data packet is intercepted, the said intercepted subsequent data packet is validated against data elements in at least one of the first transaction block and one or more transaction blocks generated after the generation of the first transaction block during the transaction session; and
    transferring, in real time, the funds into the beneficiary's financial account in an expedited fashion.

The method may comprise adding, by the slave server, a unique originator encryption code in the first transaction block, wherein the unique originator encryption code includes a hash.

The unique originator encryption code may include an Originator/Alpha hash.

Prior to the first data packet being collected, the method may comprise initiating the transaction session by receiving an opt-in signal or message from the beneficiary's device.

Each time or instance wherein a subsequent data packet is intercepted after the generation of the first transaction block, the method may comprise a step of verifying, by the slave server, the subsequent data packet against data elements in at least a predecessor transaction block generated immediately before the collection of said subsequently collected data packet.

The method may comprise incorporating, by the slave server, a unique encryption code in each subsequently generated transaction block associated with a validated subsequently intercepted data packet, wherein the unique encryption code comprises the unique encryption code including a hash and comprising a unique originator encryption code of the first transaction block.

It will be noted that continuation of verification by the internal hash algorithm within the secure private network, used to continually validate the sequence of each communicated data pack from the original slave server issued unique encryption code, which forms the chain of each transaction.

The unique encryption code may comprise a hash associated with or linked to a hash of one or more transaction blocks generated prior to the generation of said subsequent transaction block.

DETAILED DESCRIPTION OF AN EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances and are a part of the present invention. Thus, the following description is provided as illustrative of the principles of the present invention and not a limitation thereof.

It will be appreciated that the phrase "for example," "such as", and variants thereof describe non-limiting embodiments of the presently disclosed subject matter. Reference in the specification to "one example embodiment", "another example embodiment", "some example embodiment", or variants thereof means that a particular feature, structure or characteristic described in connection with the embodiment(s) is included in at least one embodiment of the presently disclosed subject matter. Thus, the use of the phrase "one example embodiment", "another example embodiment", "some example embodiment", or variants thereof does not necessarily refer to the same embodiment(s).

Unless otherwise stated, some features of the subject matter described herein, which are, described in the context of separate embodiments for purposes of clarity, may also be provided in combination in a single embodiment. Similarly, various features of the subject matter disclosed herein which are described in the context of a single embodiment may also be provided separately or in any suitable sub-combination.

Figure 1:
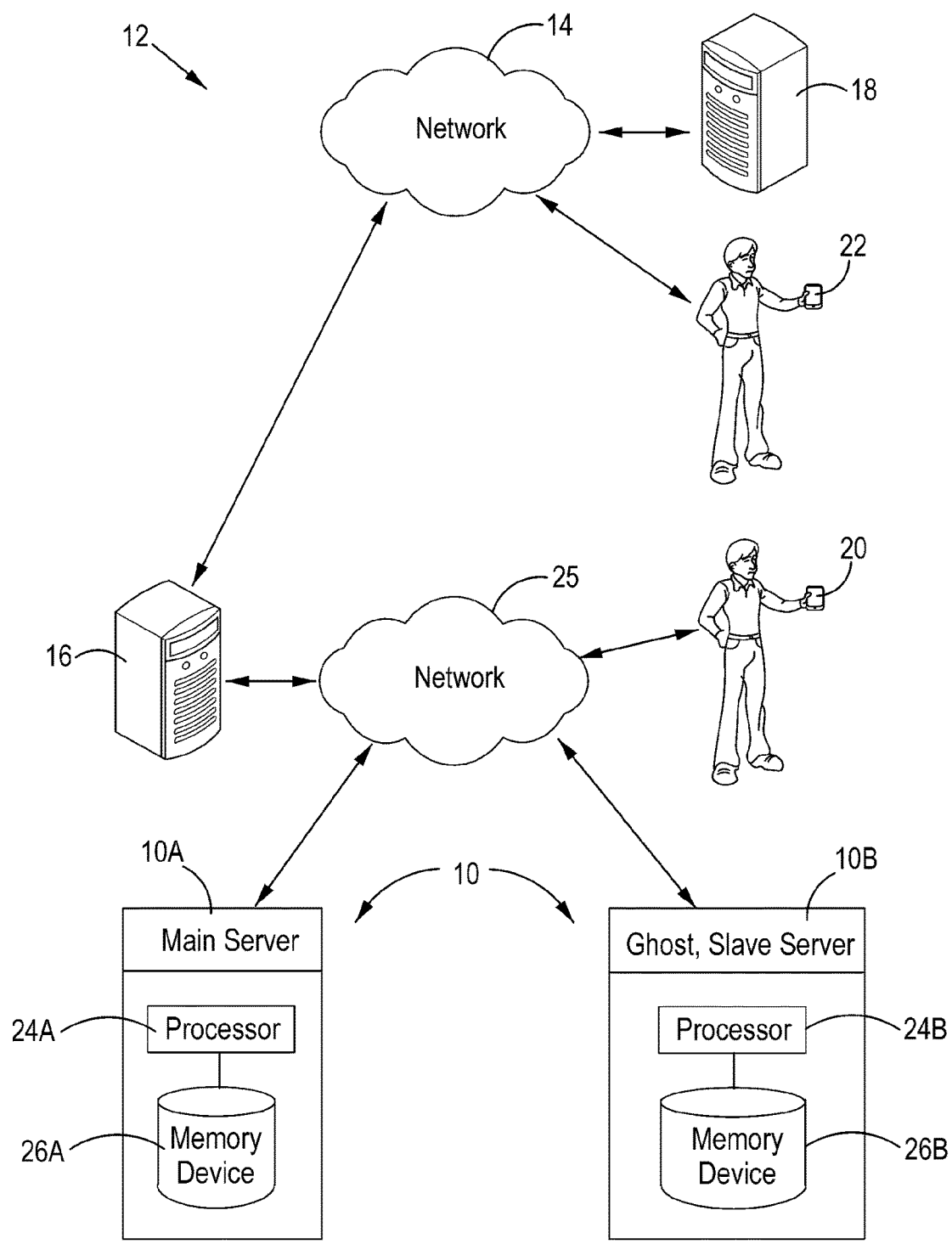
FIG. 1 shows a schematic diagram of a network incorporating a transaction system in accordance with an example embodiment of the invention.

Referring to FIG. 1 of the drawings, a network 12 incorporating a centralised transaction processing system in accordance with an example embodiment of the invention is generally indicated by reference number 10.

In accordance with the invention, the term centralised shall bear its ordinary meaning referring to "private" and "not publicly available" and "not accessible to outside parties".

The transaction system 10 is arranged to facilitate a payment transaction for the transfer of funds from a financial institution associated with a payer of funds to a financial institution associated with a beneficiary of funds in substantially an electronic manner. However, it will be understood that the present disclosure shall not be limited thereto as the system 10 may be used to facilitate a transaction for the transfer of funds between different accounts within a particular financial institution.

The transaction system 10 is further configured to verify that a payment transaction intended for a beneficiary, and in particular verify that the beneficiary is the correct person intended for the payment transaction. For ease of explanation, the transfer of funds contemplated in the manner described above will be simply referred to as the transfer of funds from the payer to the beneficiary as is colloquially understood.

To this end, the transaction system 10 is typically communicatively coupled to a bank server 16 associated with the bank of the beneficiary of funds via a private, encrypted communication network 25, and bank server 16 is communicatively coupled to a bank server 18 associated with the bank of the payer of funds via the suitable, second communication network 14 (i.e. such as payment network). The system 10, in particular central server 10A, may also be arranged to be in communication with bank server 18 via the second communication network 14.

Moreover, the transaction system 10 may be in communication with suitable computing devices (i.e. endpoint computing devices) associated with the beneficiary of funds 20 via the private network 25. The bank server 18 is arranged to be in communication with a computing device of the payer of funds 22 via the network 14. The beneficiary's endpoint device 20 may also be arranged to communicate with the bank server 16 indirectly via the private network 25 or directly via the payment network 14. It will be appreciated that the terms "endpoint device", "computing device", "communication device" may be used interchangeably herein.

The communications networks 14, 25 may comprise one or more different types of communication networks. In this regard, the communication networks may be one or more of the Internet, a local area network (LAN), a wide area network (WAN), a metropolitan area network (MAN), various types of telephone networks (e.g., Public Switch Telephone Networks (PSTN) with Digital Subscriber Line (DSL) technology) or mobile networks (e.g., Global System Mobile (GSM) communication, General Packet Radio Service (GPRS), Code Division Multiple Access (CDMA), and other suitable mobile telecommunication network technologies), or any combination thereof. It will be noted that communication within the network may achieved via suitable wireless or hard-wired communication technologies and/or standards (e.g., wireless fidelity (Wi-Fi®), 4G, long-term evolution (LTE™), WiMAX, 5G, and the like). In some example embodiments, the system 10 may be coupled to other elements of the network 12 via dedicated communication channels, for example, secure communication networks in the form of encrypted communication lines (e.g. SSL (Secure Socket Layer) encryption). The latter may be the case with the system 10 being communicatively coupled to the bank server 16 and bank server 18.

The endpoint beneficiary and payer computing devices 20, 22, or any computing device contemplated herein, may comprise one or more computer processors and a computer memory (including transitory computer memory and/or non-transitory computer memory), configured to perform various data processing operations. The devices 20, 22 also include a network communication interface (not shown) to connect to the system 10 via the network 14. Examples of the devices represented by the devices 20, 22 may be selected from a group comprising a personal computer, portable computer, smartphone, tablet, notepad, dedicated server computer devices, any type of communication device, and/or other suitable computing devices. It will be appreciated that in some example embodiments, the devices 20, 22 may be connected to network 14 via an intranet, an Internet Service Provider (ISP) and the Internet, a cellular network, and/or other suitable network communication technology.

It will be noted that though multiple bank servers may be in communication with system 10, only two are illustrated for convenience. The same applies to the beneficiary and payer devices 20, 22.

The bank server 16 and bank server 18 may comprise more than one server, which may be geographically distributed, for example, across the network 12 in a cloud computing-based fashion. The bank servers 16 and 18 may effectively hold bank accounts for the beneficiary and payer respectively in a conventional fashion. To this end, in some example embodiments where the beneficiary and the payer are part of the same bank, the bank server 16 and the bank server 18 are the same.

Moreover, though reference will be made to the beneficiary and payer, it will be appreciated that depending on the transaction, the roles may be reversed as will be understood by those skilled in the art wherein the beneficiary may also be a payer as contemplated herein, and vice versa.

The system 10 may therefore be in the form of a standalone clearing system similar those conventionally in existence which effectively clears transactions between the banks associated with beneficiaries and payers. However, it will be appreciated that in some example embodiments, the system 10 may form part of either bank server 16 or bank server, or both.

Alternately, the system 10 may be a stand-alone system which is merely communicatively coupled to an intermediary conventional bank clearing house system/server which clears transactions between banks in a conventional fashion.

Like the bank servers 16 and 18, the system 10 is typically embodied in two or more servers which are operatively communicatively connected to the private network 25 by suitable network interface/s. Though two servers 10A and 10B are illustrated in respect of the system 10, it will be appreciated that the system 10 may be incorporated in one or a plurality of networked servers spread out locally and/or geographically through the private network 25, for example, in a cloud-based computing like fashion.

The two servers 10A and 10B are the main/central server and ghost, slave server (i.e. validator server) of the transaction system 10, respectively, as will be explained in more detail below. It will be noted that the terms "main server" and "central server" may be used interchangeably herein. Similarly, the terms "ghost server", "slave server", and "validator server" may be used interchangeably herein.

The main server 10A is arranged to communicate with the bank server 16 and beneficiary's device 20 via suitable interfaces (such as an API), while the ghost server 10B is arranged to communicate with the main server 10A and beneficiary's device 20 via the private, encrypted, centralised network and suitable interface (e.g. API), however the ghost server 10B is not in communication with the bank server 16.

Though not illustrated, it will be understood that the system 10 may include one or more of a back-end (e.g., a data server), a middleware (e.g., an application server), and a front-end (e.g., a client computing device having a graphical user interface (GUI) or a Web browser through which a user can interact with example implementations of the subject matter described herein).

The system 10, particularly the one or more servers of the system 10, may include processors 24A and 24B and memory devices 26A and 26B (including transitory computer memory and/or non-transitory computer memory), which are configured to perform various data processing and communication operations associated with the system 10 as contemplated herein.

The processors 24A and 24B may be one or more processors in the form of programmable processors executing one or more computer programs to perform actions by operating on input data and generating output. The processors 24A and 24B, as well as any computing device referred to herein, may be any kind of electronic device with data processing capabilities including, by way of non-limiting example, a general processor, a graphics processing unit (GPU), a digital signal processor (DSP), a microcontroller, a field programmable gate array (FPGA), an application specific integrated circuit (ASIC), or any other electronic computing device comprising one or more processors of any kind, or any combination thereof. For brevity, steps described as being performed by the system 10 may be steps which are effectively performed by the processor 24A and 24B and vice versa unless otherwise indicated.

It will be appreciated that the memory devices 26A and 26B may be a memory store such as a database. The memory devices 26A and 26B may be in the form of computer-readable medium including system memory and including random access memory (RAM) devices, cache memories, non-volatile or back-up memories such as programmable or flash memories, read-only memories (ROM), etc. In addition, the memory device 26A and 26B may be considered to include memory storage physically located elsewhere in the system 10, e.g. any cache memory in the processors 24A and 24B as well as any storage capacity used as a virtual memory, e.g., as stored on a mass storage device.

Though not illustrated, it will be appreciated that the system 10 may comprise one or more user input devices (e.g., a keyboard, a mouse, imaging device, scanner, microphone) and a one or more output devices (e.g., a Liquid Crystal Display (LCD) panel, a sound playback device (speaker), switches, valves, etc.).

It will be appreciated that the computer programs executable by the processors 24A and 24B may be written in any form of programming language, including compiled or interpreted languages, declarative or procedural languages, and can be deployed in any form, including as a stand-alone program or as a module, component, subroutine, object, or other unit suitable for use in a computing environment. The computer program may, but need not, correspond to a file in a file system. The program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). The computer program can be deployed to be executed by one processor 24A, 24B or by multiple processors 24A and 24B, even those distributed across multiple locations, for example, in different servers and interconnected by the communication network 25.

The computer programs may be stored in the memory device 26A and 26B or in memory provided in the processor 24A and 24B. Though not illustrated or discussed herein, it will be appreciated by those skilled in the field of invention that the system 10 may comprise a plurality of logic components, electronics, driver circuits, peripheral devices, etc. not described herein for brevity.

As mentioned above, the system 10, particularly the processor 24A and 24B, are configured at least to facilitate processing a transaction from the payer to the beneficiary, particularly clearing of the transaction for payment of funds from the payer to the beneficiary in an expedited fashion while ensuring that the transaction is effected in a secure manner.

In this regard, the processor 24A is configured to receive a suitable message, for example, via the network 14, indicating that the payer, from their associated bank account, is paying a predetermined amount of funds to the beneficiary, particularly the beneficiary's bank account. Differently stated, the processor 24A may be configured to receive a suitable message indicating that money is being transferred into or is about to be transferred into the beneficiary's financial account. The details about the message may be saved on a database of the main server 10A.

Depending on the configuration of the implemented system 10, it will be appreciated that the suitable message may be received from one or more of the bank server 16, bank server 18, the device 22, the device 20, or the stand-alone clearing house system previously mentioned (not illustrated). Notwithstanding, for ease of explanation, the invention will be described with the suitable message being received by the processor 24A from the bank server 16 associated with the bank of the beneficiary. The suitable message may comprise details of the proposed transfer of funds including the amount being transferred, payer details, and beneficiary details including contact details such as an email address of the beneficiary, MSISDN (Mobile Station International Subscriber Directory Number)/cell phone number of the endpoint device 20 associated with the beneficiary, banking account number of the beneficiary, or the like.

In one embodiment of the invention, in response to receiving the suitable message, the processor 24A may be configured to generate and transmit to the end point device 20, via the private network 25, a suitable transfer notification message indicating that money is being transferred into or is about to be transferred into the beneficiary's financial account.

The transfer notification message may be an electronic message comprising information pertaining to the option of expedited clearance of the funds by the beneficiary. The electronic message may include USSD (Unstructured Supplementary Service Data) messages, SMS (Short Message Service) messages, e-mail, instant messages, push notifications on a mobile software application ('app') or the like.

In particular, the transfer notification message may prompt the beneficiary for selection of expedited clearance of the funds. The transfer notification message may therefore comprise information pertaining to any fee that will be charged for expediting the clearance of the money into the beneficiary's bank account as well as suitable terms and conditions associated with such expediting of the clearance.

In the event that the transfer notification message is opened by the beneficiary on the endpoint device 20 associated therewith, the system 10, in particular the main server 10A, is arranged to receive an opt-in signal/message/data packet/indication indicative that the beneficiary has opened or accessed the message. Stated differently, the opt-in signal is generated when the transfer notification message is opened via the user device. When the system 10 receives an opt-in signal in the manner described herein, the main server 10A may record the time at which the message was opened by the beneficiary, via the endpoint device 20, or the time the opt-in signal was received by the central server 10A.

In another example embodiment of the invention, the opt-in signal may be received by the central server 10A at the time the endpoint device 20 initiates communication with the system 10, for example by accessing a login page of the central server 10A, to allow the beneficiary to provide his/her login details for accessing the central server 10A. Stated differently, the opt-in signal may be generated at the time the endpoint device 20 initiates communication with the central server 10 but prior to the central server 10A receiving login details from the beneficiary via the endpoint device 20.

The details about the beneficiary's device 20 such as the device's IP address, machine number, mobile number from which the message has been opened, and other details associated with the beneficiary's device may be sent back to the server 10A at the time the endpoint device 20 is caused to open the notification message.

Similarly, at the time the endpoint device is caused to login to the central server 10A in the normal fashion, the details of the endpoint device 20 attempting to login to the central server 10A may be collected by the central server 10A.

As mentioned previously, at the time the transfer notification message is opened, or at the time the endpoint device 20 initiating a line of communication with the central server 10A, the system 10 may initiate a transaction session with the endpoint device 20, i.e. maintain an open line of communication between the endpoint device 20 and the main server 10.

Upon the message being opened, or the endpoint device initiating a line of communication with the central server 10A, the beneficiary's device interfacing with the main server 10A via an API will be directed to login into main server 10A to enable the beneficiary to communicate with the system 10.

The login details of the beneficiary may be sent back to the main server 10A, which main server 10A may be arranged to validate the login details against previously registered login details of the beneficiary. The main server 10A may have stored on a database thereof, the pre-registered login details of the beneficiary wishing to access the expedited clearance service. In other instances, the login details of the beneficiary to login to their financial account held by the bank server 16 may be the same as the login details which the beneficiary needs to access the service of expediting the clearance of funds through the system 10, and accordingly the central server 10A may continuously receive updated login details of the beneficiary from the bank server 16.

Accordingly, the central server 10A is arranged to validate that the login details which have been provided from the endpoint device 20.

The first set of information, hereinafter referred to as a first data packet, which is sent to the central server 10A by the endpoint device 20 includes the time the opt-in signal was received by the central server 10A, as well as the login details of the beneficiary, and also includes the details of the endpoint device 20 used to log into the central server 10A.

As soon as the central server 10A has authenticated/validated the login details of the beneficiary against the pre-stored pre-registered data, the central server 10A is arranged to transmit the first data packet or a portion thereof in a suitable format to the slave server 10B.

The slave server 10B is arranged to collect the validated first data packet or portion thereof, and accordingly uses an encryption, in particular hashing algorithm, to generate an Alpha/Originator/Prime hash that is embedded/incorporated in the validated first data packet in order to form a record of the first data packet in a form of a parent/primary/first transaction block.

Subsequent to the generation of the first transaction block, the server 10A will maintain an open communication channel with the endpoint device 20 and according to specific rules, the main server 10A will communicate with the endpoint device 20 and vice versa in order to action the beneficiary to perform various task for purposes of concluding the transaction. The beneficiary may accordingly perform suitable actions and respond back to the main server 10A.

One of the actions required to be performed by the beneficiary is to indicate whether the beneficiary desires funds to be transferred and cleared into the beneficiary's account in an expedited fashion. The beneficiary may select an appropriate option via the endpoint device.

Other actions required to be performed by the beneficiary may be to accept certain terms and conditions associated with the clearance of funds, if the beneficiary has opted for the funds to be cleared.

Each communication/message transmitted between the endpoint device 20 and central server 10A or stated differently each step/task performed by the endpoint device 20 and central server 10A during the duration of the transaction session, is in a form of a data packet. Each data packet is routed to, or intercepted by, the ghost server 10B to validate that the communication emanates from the validated beneficiary and the main server 10A. Each data packet transmitted between the endpoint device 20 and main server 10A or between the main server 10A and ghost server 10B after the generation of the first transaction block, is validated against the information (i.e. one or more data elements) in the first transaction block to ensure that the system 10 (including the servers 10A and 10B and the endpoint device 20 interacting therewith via a suitable API) has not been hacked or tampered with.

Upon validating a data packet, the ghost server 10B accordingly generates a transaction block which includes a new hash (i.e. an extension of the Alpha/Prime/Originator hash parameter) that is linked to or associated with the Originator hash. Each transaction block, generated in sequence after the generation of the first transaction block and generated in accordance with chronological tasks/communications between the endpoint device 20 and central server 10A, is stored along with the first transaction block in a form of a chain of transaction blocks, with the parent block being the first transaction block in the chain and the other transaction blocks following in sequence in accordance with the manner in which they were generated or un accordance with any other acceptable format.

Over and beyond validating a subsequent data packet to data elements in the first transaction block, the system 10 is arranged to also validate a subsequently data packet to data elements in one or more transaction blocks which were generated after the generation of the first transaction block and may also be validated against a transaction block in the chain of transaction blocks which was generated immediately before the collection/transmission of said subsequent data packet.

Accordingly, each time data packets are communicated within the system 10, each data packet is validated against the data in at least one or more transaction blocks which were generated prior to the communication of the said each data packet and once validated, the slave server 10B generates another transaction block that is added to the chain of transaction blocks.

In the event that a fraudster has intercepted the transaction session in order to manipulate the information in any one of the data packets which are communicated between the endpoint device 20 and system 10, for example by changing the amount of funds which are intended for the beneficiary and/or changing the banking account which the funds are supposed to be transferred into, the ghost server 10B will receive the modified/intercepted data packet and accordingly compare the intercepted data packet against information in any one of the generated transaction blocks. Once the ghost server 10B identifies that the intercepted data packet contains information that is not linked with any one of the generated transaction blocks, the ghost server 10B will reject the intercepted data packet and accordingly proceed to terminate the transaction session or report the rejection of the intercepted data packet to the central server 10A to cause the main server 10A to terminate the transaction session.

In the event that the beneficiary is interrupted from submitting a data packet, for example as a result of a failure in the connection between the main server 10A and endpoint device 20, the system 10 will detect the incomplete transmission in the data packet and remain in a pending state until the beneficiary has logged back into the system 10, and the necessary authentications have been conducted, in order to allow the continuation in the collection of subsequent data packets. The system 10 may remain in a pending state during the transaction session for a predetermined period of time, for example, 15 minutes, after which, if there is no activity relating to the transaction from the endpoint device 20, the system 10 may terminate the transaction session.

In another example embodiment of the invention, the opt-in signal collected by the main server 10A may be indicative that the beneficiary wishes to expedite the clearance of funds, and this indication may be received by the central server 10A even before the beneficiary submits login details to the central server 10A. Typically, the mere opening of the notification message via the endpoint device 20 may be indicative that the beneficiary is interested in expediting the transfer and clearance of funds into his/her financial account. Accordingly, any subsequent data packets will be collected and verified with regard to other actions which need to be performed by the beneficiary in order to complete the transaction, one of which actions may include the acceptance of any terms and conditions associated with their acceptance of the clearance of funds. The terms and conditions may include a service fee that will be charged to the beneficiary for requesting that the funds be cleared in an expedited fashion.

The service charge fee may be deducted from the beneficiary's financial account and/or the funds which are being immediately transferred into the beneficiary's financial account. In one example embodiment, the service charge fee may accumulate over a period of time (monthly, typically) and then be deducted from the beneficiary's financial account. In respect of all these deduction options, the main server 10A may be arranged to, during the transaction session, prompt the beneficiary to specify the preferred option (or combination of options). In one example embodiment, the service charge fee may be absorbed by the financial institution associated with the beneficiary. As mentioned before, each time the main server 10A communicates with the endpoint device 20, appropriate validations are conducted to ensure that the beneficiary with whom the main server 10A communicates with is the correct beneficiary linked to the intended transaction.

In one example embodiment, the main server 10A prompts the beneficiary to agree to the deduction of the service charge fee (to secure the required contractual agreement with the beneficiary). In this example embodiment, the financial institution associated with the payer may be instructed by bank server 16 to delay the transfer of money into the beneficiary financial account, pending confirmation from the beneficiary that the service charge fee may be deducted. Upon receiving agreement that the service charge fee may be deducted, the main server 10A may proceed to instruct bank server 16 to instruct bank server 18 to release the funds, and accordingly the funds may accordingly be cleared and transferred into the beneficiary's financial account in an expedited fashion, as defined above. This can be defined as, but not limited to, a banker's lien which results in the beneficiary receiving a net balance settlement of incoming funds.

In another example embodiment, once all the required data packets, which may have been pre-set by the system 10 in accordance with specific rules, have been collected and validated, the system 10 is arranged to transmit a suitable message to bank server 16 to report that the beneficiary has been validated and accordingly arrange for bank server 16 to clear the funds into the beneficiary's account, irrespective of whether bank server 18 has cleared the funds to bank server 16.

Alternatively, the server 10, in particular processor 26A may be configured to clear the funds into the beneficiary financial account in an expedited fashion which effectively permits the funds to reflect in the beneficiary's bank account within a relatively short space of time, in real-time, or in near real-time for access by the beneficiary.

The processor 24A may clear the funds in an expedited fashion by processing the payment from the payer bank faster, by urging the stand-alone clearing system to process the payment faster, or in a substantially similar fashion as the conventional payer driven expedited payment mentioned in the "Background of the Invention" section.

Conversely, should the beneficiary not wish to expedite the receipt of the funds, they would not necessarily respond, and the transaction would be cleared in the usual time frame for such transactions. Alternately, they may actively decline the expedited receipt of the funds by communicating with the main server 10A.

In one example embodiment, the transfer notification message may comprise a permission notification in the event that the beneficiary is added as a beneficiary on the payroll and/or financial account of the payor, wherein the permission notification presents the beneficiary with an option to accept or decline future clearance of all monies which the payer intends to transfer to the beneficiary in an expedited manner as described herein. For example, so as to permit the clearance of the transferred money to occur automatically on future dates on which the transfer of money will take place in an expedited manner as described herein. It will be appreciated that the permission notification may comprise of terms and conditions associated with the service for expedited clearance of the funds, and the appropriate validations of data packets transmitted between the endpoint device and main server 10A and ghost server 10B may be conducted by the system 10.

Differently stated, when the payor inputs the details of the beneficiary in the payor's device 22, the payor may opt to save the details of the recipient/beneficiary as a future or frequent recipient/payee/beneficiary of the payor, wherein the beneficiary's details are stored under the banking profile of the payor which is administered by the payor's bank server 18. Upon saving the details of the beneficiary, the payor's bank server 18 may be arranged to transmit a transfer notification message comprising a permission notification to the beneficiary's bank server 16 for onward transmission to the beneficiary user device 20 either directly or indirectly via the system 10. The permission notification may include details such as service charges which will be automatically charged to the beneficiary for accepting to have funds/money to be immediately transferred to the beneficiary's bank account from the payor's bank account in all future transfers which will be made by the payor, and also authorise the payor bank server 18 to automatically clear all future monies which will be transferred by the payor into the beneficiary's bank account.

Upon receiving the permission notification which comprises a prompt for prompting the beneficiary to either accept or decline the clearance of monies which will be transferred to the beneficiary in the future, the beneficiary may either accept or decline the permission notification, via the beneficiary device 20, and the response will be transmitted to the relevant bank servers for processing.

Figure 2:
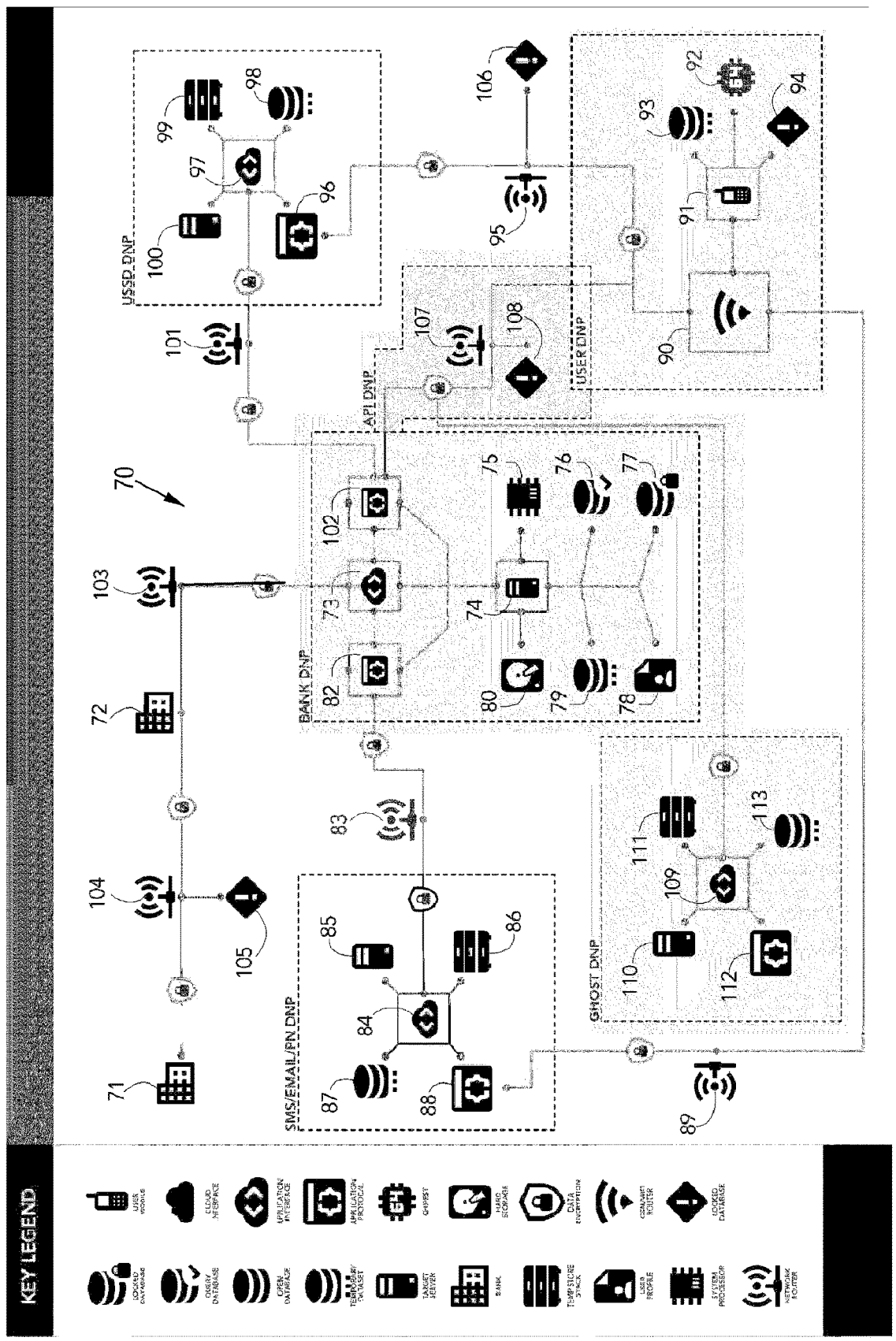
FIG. 2 shows an architecture roadmap of the transaction system in accordance with the invention.

Referring now to FIG. 2 of the drawings, there is provided building blocks and an infrastructure roadmap of the system in accordance with the invention designated herein as reference numeral 70.

As is known in the art, DNP (Digital notification protocol) refers to a protocol that incorporates the sending of an encrypted method in part of a chain of methods to trigger a response for a two-way communication within the chain itself, using any DTM available.

As is also known in the art, DTM (Digital Transportation Method) includes methods such as USSD, SMS, EMAIL, PUSH NOTIFICATION, or any other path meant for two-way communication using WIFI, GSM, RFID, NFC or similar digital technologies.

In the present invention, as shown in FIG. 2, the symbol "[<->]" denotes a back-and-forth open channel communication using the same protocol from when it came.

Now turning our attention to the features on FIG. 2 in view of the disclosure herein, a beneficiary's bank 72 receives intent of payment from a payor's bank 71 via pre-existing DNP and DTM. The intent is received as a digital notification query of intention to transfer funds from payor's bank 71 via the network 104 to beneficiary's bank 72 via network 103. The beneficiary's bank 72 accordingly transmits the intent to a central server 74. Network 103 can also be configured to relay the notification from the payor's bank server 71, via network 104, to the central server 74. Receipt of the intent, in a form of a digital notification, is arranged to trigger a processor 75 of the central server 76 to action/query datasets in a temporary database 79, hard drive 80 and query database 76 in search of the intended recipient in order to locate the recipient's user profile 78.

The searching of the temporary and query databases 79 and 76, respectively, flags a Boolean return result of whether the intended recipient has a valid account number that is associated with an account number of the recipient contained in an appropriate database of the beneficiary's bank 71, and issues a response to the beneficiary's bank 71 on the result.

If the result is false, notification is returned as false, the request is deleted, and the notification channel is closed 105.

If the result is true, notification with its package parameters are stored in a temporary database 79, notification is returned as true and the processor 75 of the central server 76 communicates the verification of the recipient/beneficiary with the beneficiary's bank 71 and the notification channel is closed 105.

Upon validating the beneficiary/recipient, the processor 75 uses the available notification method preferences set by the beneficiary in the beneficiary's profile 78 and initiates a communication with the beneficiary via relevant DTM 82.

The processor 75 initiates an open call/communication protocol with a DTM host 83, 84, 85, 86, 87 based on either the beneficiary cell phone number or e-mail address, and when connection is established, pushes through the connection via a communication protocol 88. The DTM uses all available methods to link to the recipient and sends through an intended notification message to the beneficiary's device 91 through relevant networks 89 and 90. The processor 75 stores information pertaining to the notification message sent to the beneficiary.

Alternatively, the beneficiary's bank 72 may issue a notification message to the beneficiary that funds have been paid by a payor and request the beneficiary to indicate whether such funds should be cleared in an expedited fashion into the account of the beneficiary. The transmitted notification message may be routed to the central server 74 so that the information related to the transfer notification message is saved in one of the databases 76, 77, 79, 80 of the central server 74.

The recipient/beneficiary receives notification via the DNP selected in his/her preferences. The beneficiary receives the notification via the DTM. This could, for example, be a SMS, instant message, push-notification in-app notification, an email, or the like.

Upon the beneficiary opening the notification received on the beneficiary's device 91, the beneficiary may be routed, via the beneficiary's device 91 to a platform, such as a login page, in which the beneficiary is required to enter their login details. In an alternative example embodiment, the notification message received by the beneficiary may include instructions that the beneficiary may be required to enter a USSD code, and upon entering the USSD code, the beneficiary's device 91 may be linked via an application protocol 96 to connect to a USSD platform 97, 98, 99, 100 to allow the beneficiary to provide the required login details.

Upon providing the login details, a first set of information (i.e. a first data packet) containing information including an indication that the notification message was opened, including the unique universal ID of the beneficiary's device, the IP address of the beneficiary's device and optionally the mobile phone number of the beneficiary's device and/or machine number of the beneficiary's device 91, and the login credentials of the beneficiary, are transmitted to the central server 74.

The opening of the notification message may prompt the beneficiary to indicate her intent to have funds transferred into her account in an expedited fashion.

The opening of the notification message, provision of the intent, and provision of the login details initiates a communication, which is driven by the beneficiary between the beneficiary's device 91 and the central server 74 and accordingly establishes a Proof of Authority network between the beneficiary's device/node 91 and the central server 74 as well as a validator node, i.e. slave server 109, as will be described below. The initiated communication between the beneficiary's device 91 and central server 74 via a network 107 initiates a transaction session between the beneficiary via the beneficiary's device 91 and the central server 74.

The first set of information is accordingly transmitted to the central server 74 and validated against datasets in any one of the databases 76, 77, 79, 80 and the user's profile 78. One of the datasets with which the first data packet is compared against may include the login details of the beneficiary as stored in the beneficiary's profile 78 and may also include details of the notification message routed to the central server 74 by the beneficiary's bank 72 at the same time as or prior to the notification message being sent to the beneficiary's device 91, or may include details about the notification message that was generated by the central server 74 and transmitted to the beneficiary's device via the relevant networks 89, 90.

Upon validating the first set of information received from the device 91 against the information in the databases 76, 77, 79, 80 and information including information/data received from the bank server 71 and/or bank server 72, the central server 74 is arranged to transmit the validated first set of information (i.e. first data packet from the user device 91) or at least a portion of the validated first data packet in a suitable format to the ghost/validator server (i.e. slave server) 109.

If the first data packet is invalidated by the central server 74, the central server 74 terminates the transaction session. However, if the first data packet is validated, the central server 74 transmits the validated first data packet to the ghost server 109.

The ghost server 109 accordingly receives the validated first data packet and applies an encryption algorithm thereto, in particular applies a hashing algorithm to embed an Originator/Alpha/Prime hash into the first data packet. The application of the Originator hash accordingly results in the generation of a first/primary/parent transaction block, which will be used to sequentially verify all additional data packets that will be communicated between the user device 92 and the central server 74 and/or between the central server 74 and ghost server 109, before generating a transaction block for each validated packet, wherein each generated transaction block will include an extended hash incorporating the hash of a predecessor transaction block including the hash of the parent transaction block.

While the beneficiary maintains an open communication with the central server 74 via the suitable network 107, data is continuously transmitted from the beneficiary's device 91 via the network 107 each time the beneficiary performs an action on the device 91, which action is arranged to be processed by the central server 74. Each time data/information is transmitted towards the central server 74 from the beneficiary's device 91 or vice versa, the data is transmitted in a form of a data packet.

The slave server 109 (i.e. validator node) comprises suitable processors (not shown) and memory devices (not shown) containing machine readable media which contain instructions that are arranged to cause the slave server 109 to collect details of the primary/parent transaction block including the first data packet and Originator hash.

Stated differently, after the generation of the parent/first transaction block, a second data packet is transmitted from the beneficiary's device to the central server 74 or vice versa or a data packet is transmitted between the central server 74 and ghost server 109 in accordance with specific rules, that second data packet is first routed to the ghost server 109 in order to validate that the second data packet emanates from the correct node (i.e. either the beneficiary's device 91 or the central server 74). The second data packet is then automatically compared to the information in the parent transaction block to ensure that the information (i.e. data elements) contained in the collected data packet that is routed to the ghost server 109 includes information (i.e. data elements) contained in the parent transaction block, wherein the information includes details such as the IP address of the device 91 and/or machine identifier data of the beneficiary's device 91, and any other pertinent data. Once the information is compared and validated, the ghost server 109 generates a new hash (i.e. an extension of the Alpha/Prime/Originator hash parameter) that is linked to, or is an extension of the Originator hash in the parent transaction block, and applies the new hash (i.e. an extension of the Alpha/Prime/Originator hash parameter) to the collected data packet in order to generate a new, progeny transaction block. The progeny transaction block is then stored temporarily in a database 111, 113 of the ghost server 109. Accordingly, when a subsequent data packet is transmitted between the ghost server 109 and central server 74 or transmitted between the central server 74 and beneficiary's device 91, the data in that subsequent data packet is compared to the data in at least one or more of the aforementioned progeny transaction block and the parent transaction block in order to validate the data packet, and once validated, the ghost server 109 generates and applies a new hash (i.e. an extension of the Alpha/Prime/Originator hash parameter) to the data packet and accordingly generates another progeny transaction block that is linked to the predecessor, progeny transaction block.

The ghost server 109 is arranged to perform this process during the cause of the transaction session (i.e. the session in which data is transmitted between the beneficiary's device 91 and central server 74 and/or between the central server 74 and ghost server 109) until all required data packets have been collected and validated and accordingly until a chain of all required transaction blocks have been generated.

While the beneficiary, via the beneficiary's device 91, maintains the open channel with the central server 74 via the network 107, the beneficiary may select that she wishes to have funds intended for him transferred to him in an expedited fashion. As mentioned before, the intention to have the funds cleared in an expedited fashion may have been received by the central server 74 when the beneficiary opened the notification message. However, in other instances, as described herein, once the beneficiary logs into the central server 74, the beneficiary may be presented with the option to select whether he/she wishes to have the clearance and transfer of funds expedited. The beneficiary may also be required to agree to terms and conditions associated with her desire to have the funds cleared in an expedited fashion into her account. As mentioned before, the data transmitted from the beneficiary's device to the central server 74 is validated by the ghost server 109 to ensure that the transaction is not tampered with.

Once all the necessary data packets have been collected from the beneficiary's device 91 and those data packets sent between the central server 74 and ghost server 109 have been validated and/or corresponding transaction blocks have been generated, the central server 74 is arranged to transmit a suitable message to the beneficiary's bank server 72 to alert the bank server 72 that the beneficiary has been authenticated and that the request to transfer funds has also been validated. The beneficiary's bank server 72 will accordingly inform the payor's bank 71 to clear the funds. Alternatively, the beneficiary's bank server 72 may automatically advance the funds to the beneficiary's account while waiting for the payor's bank 71 to clear the funds.

Alternatively, the central server 74 is arranged to communicate directly with the payor's bank 71 to indicate that the beneficiary requires the funds to be released in an expedited fashion into a financial account of the beneficiary held by the beneficiary's bank 72.

Processor 75 sends notification to beneficiary via the preferred DTM of funds cleared and terminates the transaction session. The processor 75 updates the beneficiary's profile, moves the dataset into database 77 for locked storage and ends transaction.

Figure 3:
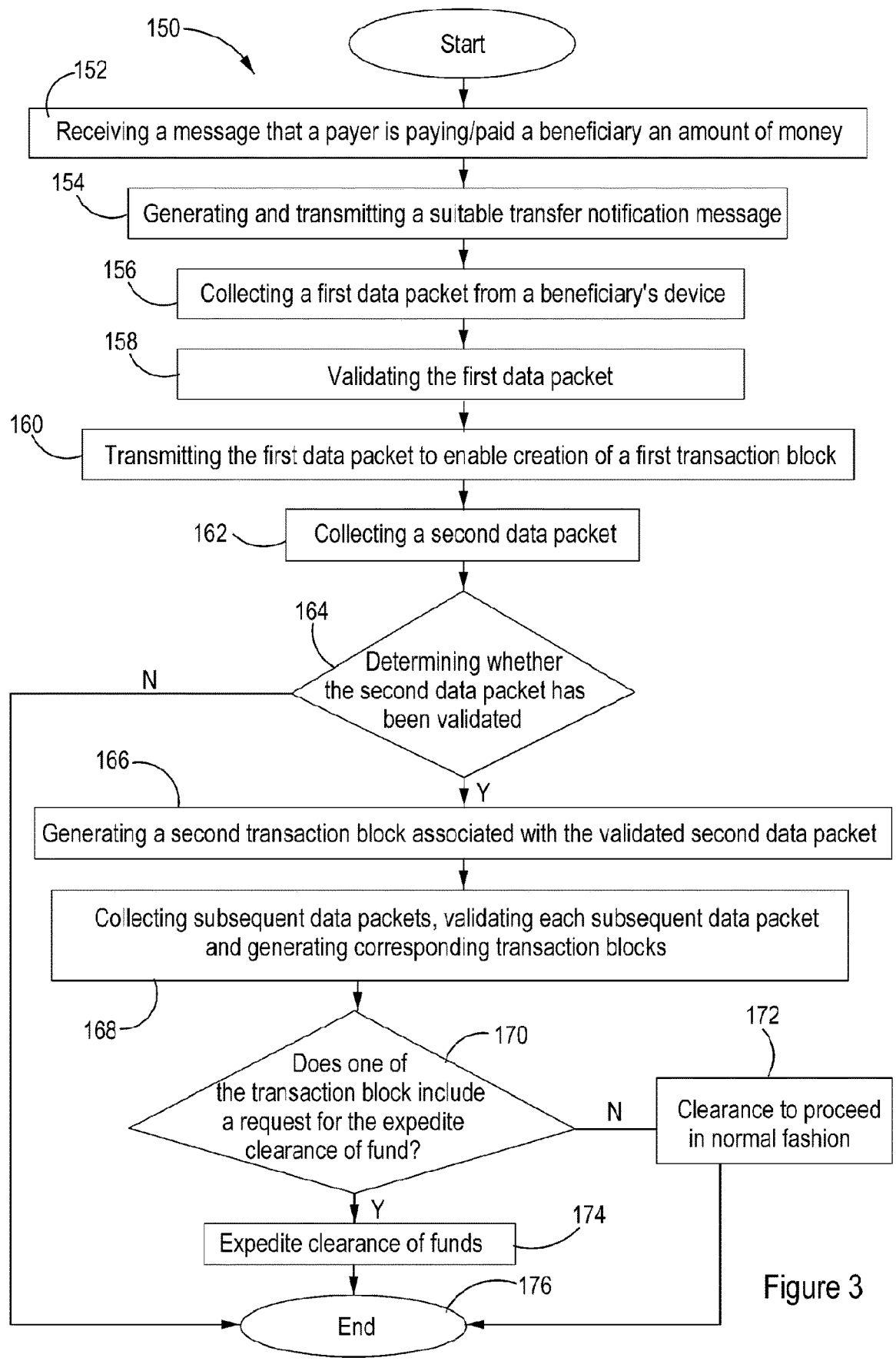
FIG. 3 shows a high-level block flow diagram of a computer-implemented method in accordance with a first example embodiment of the invention.

Referring now to FIG. 3 of the drawings where a high-level flow diagram of a method in accordance with a first example embodiment of the invention is generally indicated by reference numeral 150. It will be appreciated that the example method 150 may be implemented by systems and means not described herein. However, by way of a non-limiting example, reference will be made to the method 150 as being implemented by way of the system 10, 70, as described above.

The method 150 is a high-level computer-implemented method of facilitating a financial transaction between a payer and payee/beneficiary, particularly the payment of funds from the payer's bank account to the beneficiary's bank account.

The method 150 comprises receiving, at block 152 by way of the processor 24, 75, a suitable message that the payer is paying the beneficiary a sum of money, wherein the suitable message contains sufficient information to identify the beneficiary, their bank account, the quantum of the funds to be transferred as well as the name and contact details of the beneficiary. As mentioned above, the source of the message would depend on the specific example embodiment implemented but for brevity, the message is received from the bank server 18, 71 to bank server 16, 72 over the communication network 14, 104 and from bank server 16, 71 to the system 10 or central server 74 via the network 25, 103, respectively.

In response to receiving the suitable message at block 152, the method 150 comprises generating and transmitting, at block 154 via the processor 24, 75 a transfer notification message to the endpoint device 20, 91 associated with the beneficiary in a manner described above, typically over the network 25, 89, 90. The transfer notification message may be sent by bank server 16, 72 to the endpoint device 20, 91 or by the system 10 central server 74 may generate and transmit the message to the endpoint device 20, 91. The transfer notification message effectively notifies the beneficiary that money is transferred or about to be transferred into the beneficiary bank account.

As will be evident to those skilled in the art, the transfer notification message may comprise information pertaining to the transaction, particularly the transfer/payment value, the details of the payer, as well as details pertaining to the convenient option of expedited clearance driven by the beneficiary as described herein.

The transfer notification message may be arranged to prompt the beneficiary to select whether or not the money that is being transferred should be cleared immediately. Accordingly, as soon as the beneficiary opens the message (and has provided appropriate login details to enable the beneficiary to access the message and other information in the message), the method includes collecting, at block 156, an opt-in signal along with a first data packet from the endpoint device 20, 91, which data packet includes the beneficiary's device unique identification data, the beneficiary's login details as well as an intent by the beneficiary to either expedite the clearance of funds or reject the clearing of funds in an expedited fashion.

The transmission of the first data packet is arranged to initiate a transaction session from the beneficiary's side and accordingly trigger intermediate steps performed in accordance with the method 150 to validate the transaction and also validate/authenticate the beneficiary.

The method 150 further comprises the step of validating, at block 158, via the central server 10A, 74, the first data packet, or at least some data elements in the first data packet, against other data that may be received from the bank servers 16, 18, 71, 72 and/or data previously stored in the databases associated with the central servers 10A, 74. Upon validating the first data packet, or in particular some data elements contained in the first data packet, the method includes transmitting, at block 160, the first data packet to a ghost server 10B, 109 to generate a primary transaction block including an Alpha hash for the first data packet.

Accordingly, the method includes the step of collecting, at block 162, a second data packet communicated between the endpoint device 20, 91 and the central server 10A, 74 or communicated between the central server 10A, 74 and ghost server 10B, 109, so as to validate the second data packet against data in the first transaction block.

The method 150 comprises the step of determining, at block 164, whether the second data packet has been validated or invalidated. If the data packet received at the time of verification is not validated, the method 150 includes terminating the transaction session, at bock 176. Accordingly, the method 150 may include the step of sending a suitable report to bank server 16, 72 that the beneficiary has not been verified to enable bank server 16, 72 to take appropriate steps, such as ensuring that the funds are not transferred into the financial account of the beneficiary.

If the data packet is validated, the method 150 includes the step of generating, at block 166, a new transaction block incorporating a new hash that may be linked to the Alpha hash or may be an extension of the Alpha hash. The newly generated transaction block is accordingly linked with the parent transaction block or any transaction block that preceded the newly generated transaction block, in a form of a chain of transaction blocks. The newly generated transaction block is then stored/saved in a suitable database.

The method 150 further includes the step of collecting, at block 168, other data packets during the course of the transaction session and validating each subsequently collected data packet so as to form a transaction block associated with each validated data packet. Each generated transaction block includes a new hash that is an extension of the transaction block preceding the newly generated transaction block, and wherein the new hash includes details of the Alpha hash.

Similar, if all the data packets which are required to be validated during the transaction session have all been validated, the method 150 may include an intervening step of reporting the verification process to bank server 16, 72.

In the event that the beneficiary has opted to have the money transferred and cleared immediately, the method 150 includes the step of determining, at block 170, whether one of the transaction blocks in the chain of transaction blocks includes a data packet that has a data element that indicates a request to expedite clearance of funds/money into the beneficiary's financial account.

If one of the validated transaction blocks indicates that the beneficiary does not wish to have the funds cleared in an expedited manner, the method 150 includes the step of recording, at block 172, that the clearance of funds should not be expedited and that the funds should be released in the normal, conventional fashion.

If, however, one of the transaction blocks indicates that the beneficiary does wish to have the funds cleared in an expedited manner, the method 150 includes the step of recording and initiating the clearance of funds, at block 174, that the clearance of funds should be expedited. The method 150 may include transmitting a suitable instruction to bank server 16 that the funds can be released into the account of the beneficiary. Bank server 16, 72 can accordingly arrange for the funds to be released in the expedited fashion into the account of the beneficiary.

Though not illustrated, the method 150 may comprise deducting a service charge fee associated with the request of expedited clearance from one or both of the beneficiary account and the money that is being immediately transferred into the beneficiary bank account. In this way, the beneficiary fits the bill for the expediting of the clearance.

It will be appreciated that computer-implemented method steps of receiving the transfer notification message, receiving the expedite clearance request message, verification of the transaction, receiving the expedited clearance decline request, and transferring and clearance of the money into the beneficiary bank account, may occur substantially in real time.

Figure 4:
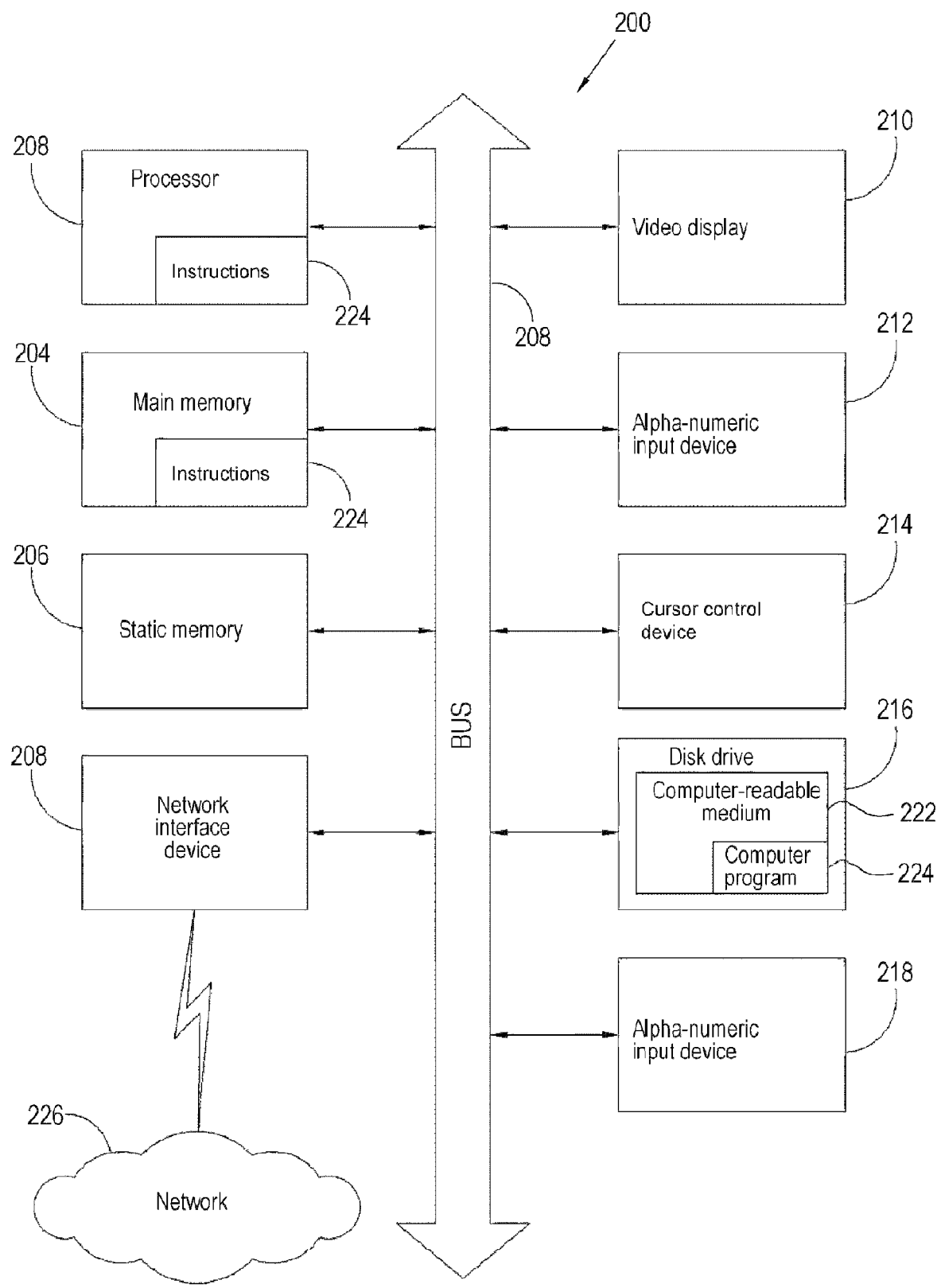
FIG. 4 shows a diagrammatic representation of a machine in the example form of a computer system in which a set of instructions for causing the machine to perform any one or more of the methodologies discussed herein, may be executed.

Referring now to FIG. 4 of the drawings which shows a diagrammatic representation of machine in the example of a computer system 200 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines, including virtual machines, that individually or jointly execute a set (or multiple sets) of instructions to perform any one or more of the methodologies discussed herein.

In any event, the example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse, or touchpad), a disk drive unit 216, a signal generation device 218 (e.g., a speaker) and a network interface device 220.

The disk drive unit 216 includes a non-transitory machine-readable medium 222 storing one or more sets of instructions and data structures (e.g., software 224) embodying or utilised by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilising any one of a number of well-known transfer protocols (e.g., HTTP).

Although the machine-readable medium 222 is shown in an example embodiment to be a single medium, the term "machine-readable medium" may refer to a single medium or multiple medium (e.g., a centralized or distributed memory store, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

The Inventors believe that the system as described herein provides a convenient alternative to facilitating expedited transfer of funds between a payer/payor and a payee in a secure manner which allows more flexibility to the beneficiary. Moreover, it will be noted that though the Inventors have provided a few example embodiments of the invention described herein, the present system may co-exist with conventional payer driven expedited payment systems and may in fact piggy-back off the existing conventional structures/system which facilitate payer driven expedited payments to be able to allow a beneficiary to drive expedited receipt of funds.

The invention claimed is:

1. A computer-implemented method of securely processing a financial transaction over a private, centralised network in a transaction encryption system including a slave server, and a central server in communication with the slave server through the private, centralised network, wherein the method comprises:
   generating, by the slave server, a first transaction block associated with a validated first data packet including at least one or more validated data collected at least from a user device initiating a transaction session; and
   after the generation of the first transaction block, the method comprises:
      continuously intercepting, in real time and during the transaction session, by the slave server, subsequent data packets which are transmitted over the private, centralised network between the central server and the user device;
      generating, by the slave server, subsequent transaction blocks associated with each of the subsequent data packets intercepted during the transaction session, on the proviso that each time a subsequent data packet is intercepted during the transaction session, the said intercepted subsequent data packet is first validated by the slave server against data elements in at least one of the first transaction block and one or more transaction blocks generated after the generation of the first transaction block during the transaction session; and
      terminating the transaction session when one of the intercepted data packets is determined to be invalid by the slave server.

2. The computer-implemented method according to claim 1, wherein prior to generating the first transaction block, the method comprises collecting, directly by the central server, the first data packet from the user device initiating the transaction session and validating at least one or more of the data in the first data packet so as to validate the first data packet, wherein the first data packet is communicated directly to the central server at the exclusion of the slave server.

3. The computer-implemented method according to claim 1, wherein the first data packet comprises data elements that comprise identifier data of a beneficiary associated with the user device.

4. The computer-implemented method according to claim 3, wherein the first data packet comprises data elements that comprise a unique identification data of the user device, wherein the identifier data of the beneficiary includes pre-registered credentials of the beneficiary, wherein the pre-registered credentials are arranged to enable the beneficiary, via the user device, to access and communicate with the central server.

5. The computer-implemented method according to claim 1, wherein the method comprises:
   validating, by the central server, at least one or more data elements in the first data packet against a predefined set of data, wherein the predefined set of data includes pre-registered credentials of a beneficiary associated with the user device, to thus enable the validated first data packet to be transmitted to the slave server to enable the slave server to generate the first transaction block based on the validated first data packet.

6. The computer-implemented method according to claim 1, wherein the first transaction block comprises a unique originator encryption code comprising a hash.

7. The computer-implemented method according to claim 6, wherein the hash is an Originator/Alpha hash.

8. The computer-implemented method according to either claim 6 or 7, wherein the hash is incorporated in the validated first data packet.

9. The computer-implemented method according to claim 1, wherein prior to the first data packet being collected, the method comprises initiating the transaction session by receiving a suitable opt-in signal or message from the user device, wherein the opt-in signal is generated:
   in response to an electronic message associated with the financial transaction being opened or accessed by the user device; and/or
   in response to the user device initiating communication with the central server.

10. The computer-implemented method according to claim 1, wherein each time a subsequent data packet is transmitted by either the user device or the central server after the generation of the first transaction block, the method comprises intercepting and verifying, by the slave server, the subsequent data packet against data elements in at least a predecessor transaction block generated immediately before the transmission of said subsequent data packet.

11. The computer-implemented method according to claim 1, wherein the method comprises adding, by the slave server, a unique encryption code in each subsequently generated transaction block, wherein the unique encryption code of each transaction block comprises a hash, and the unique encryption code further comprising a unique originator hash of the first transaction block.

12. The computer-implemented method according to claim 11, wherein the unique encryption code of each transaction block comprises a hash associated with or linked to a hash of one or more transaction blocks generated prior to the generation of said subsequently generated transaction block.

13. The computer-implemented method according to claim 1, wherein the transaction session is in respect of a financial transaction, and wherein one of the subsequently collected data packets includes a data element configured to indicate a request by a beneficiary, via the user device, to expedite a clearance of funds into a financial account associated with the beneficiary.

14. The computer-implemented method according to claim 13, wherein upon all the required data packets transmitted during the transaction session being validated and corresponding transaction blocks thereof being generated to thus generate a chain of transaction blocks which are linked to the first transaction block, the method comprises:
determining whether any one of the validated data packets or transaction blocks includes an indication of whether the beneficiary desires to have funds cleared in an expedited fashion, and expediting or facilitating the expediting of the clearance of funds in a financial account associated with the beneficiary.

15. A transaction encryption processing system, wherein the system comprises:
a first processor; and
a second processor in communication with the first processor over a private, centralized network, wherein
the first processor is arranged to generate a first transaction block associated with a validated first data packet including one or more validated data collected at least from a user device initiating a transaction session;
the first processor is configured to continuously intercept, in real time and during the transaction session, subsequent data packets which are transmitted over the private, centralised network between the second processor and the user device; and
wherein the first processor is configured to generate subsequent transaction blocks associated with each of the subsequent data packets intercepted during the transaction session, on the proviso that each time a subsequent data packet is intercepted, the said intercepted subsequent data packet is validated against data elements in at least one of the first transaction block and one or more transaction blocks generated after the generation of the first transaction block during the transaction session; and terminating the transaction session when an intercepted data packet is determined to be invalid by the first processor.

16. A computer-implemented method of securely expediting the clearance of funds into a financial account of a beneficiary, wherein the method comprises:
initiating a transaction session, by a beneficiary's device, over a private, centralised network;
receiving, by the central server, a first data packet from the beneficiary's device, the first data packet including credentials of the beneficiary which are to be authenticated by the central server against a pre-set of pre-stored data;
validating, by the central server, the first data packet;
generating, by a slave server, in the private, centralised network, a first transaction block associated with the validated first data packet;
wherein after the generation of the first transaction block, the method comprises:
intercepting, by the slave server, during the transaction session subsequent data packets which are transmitted over the private, centralised network between the central server and the beneficiary's device, wherein one of the subsequent data packets comprises a data element comprising a request to expedite the transfer and clearance of funds into the financial account of the beneficiary;
generating, by the slave server, in the private, centralised network, subsequent transaction blocks associated with each of the subsequent data packets intercepted during the transaction session, on the proviso that each time a subsequent data packet is intercepted, the said intercepted subsequent data packet is validated against data elements in at least one of the first transaction block and one or more transaction blocks generated after the generation of the first transaction block during the transaction session; and
transferring, in real time, the funds into the beneficiary's financial account in an expedited fashion.

17. The computer-implemented method according to claim 16, wherein the method comprises adding, by the slave server, a unique originator encryption code in the first transaction block, wherein the unique originator encryption code includes a hash.

18. The computer-implemented method according to claim 17, wherein the unique originator encryption code includes an Originator/Alpha hash.

19. The computer-implemented method according to claim 16, wherein prior to the first data packet being collected, the method comprises initiating the transaction session by receiving an opt-in signal or message from the beneficiary's device.

20. The computer-implemented method according to either claim 17 or 18, wherein each time or instance wherein a subsequent data packet is intercepted after the generation of the first transaction block, the method comprises verifying, by the slave server, the subsequent data packet against data elements in at least a predecessor transaction block generated immediately before the collection of said subsequently collected data packet.

21. The computer-implemented method according to claim 16, wherein the method comprises incorporating, by the slave server, a unique encryption code in each subsequently generated transaction block associated with a validated subsequently intercepted data packet, wherein the unique encryption code comprises the unique encryption code including a hash, and a unique originator encryption code of the first transaction block.

22. The computer-implemented method according to claim 21, wherein the unique encryption code comprises a hash associated with or linked to a hash of one or more transaction blocks generated prior to the generation of said subsequent transaction block.

\* \* \* \* \*